May 3, 1960     D. S. PERRY     2,934,965
PARKING WINDSHIELD WIPER

Filed March 25, 1957     3 Sheets-Sheet 1

INVENTOR.
DONALD S. PERRY
BY
Falvey, Souther & Stoltenberg
ATTORNEYS

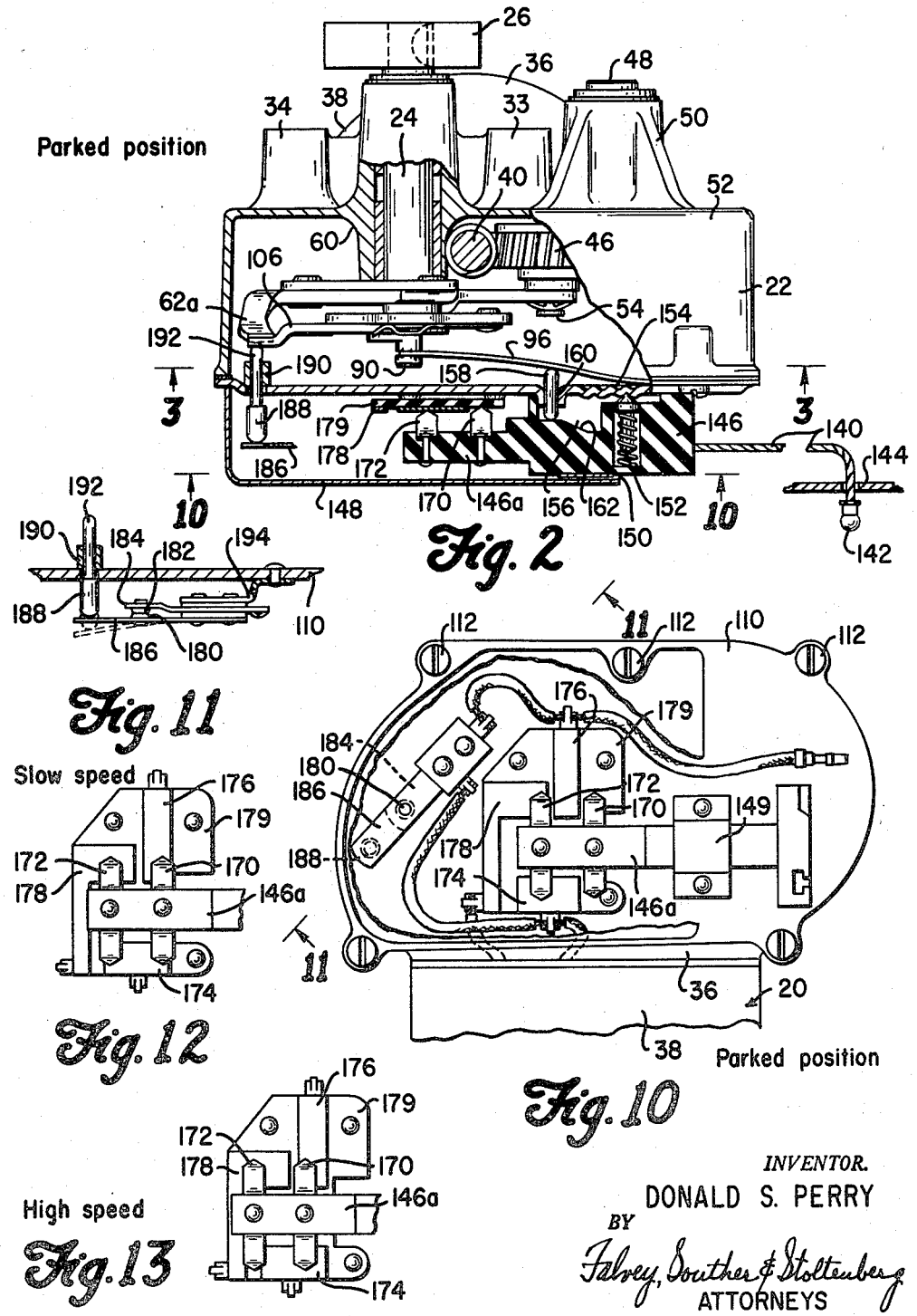

May 3, 1960 D. S. PERRY 2,934,965
PARKING WINDSHIELD WIPER
Filed March 25, 1957 3 Sheets-Sheet 3
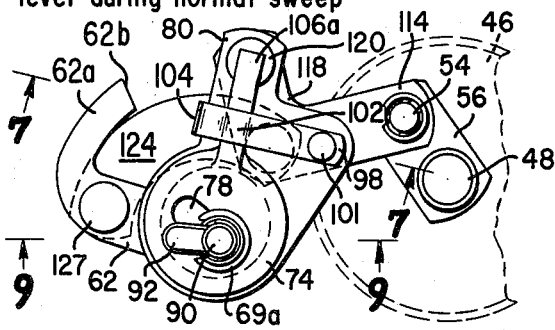
Fig. 4 — Location of cam plate and integral lever during normal sweep
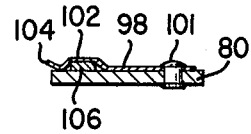
Fig. 7
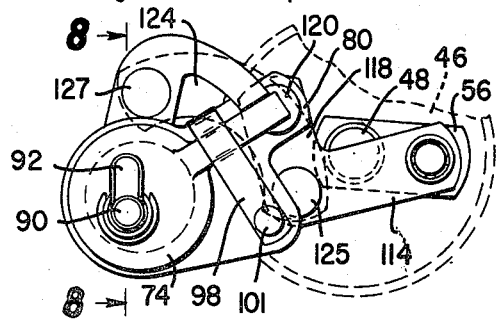
Fig. 5 — First sweep locking cam plate and integral lever in place
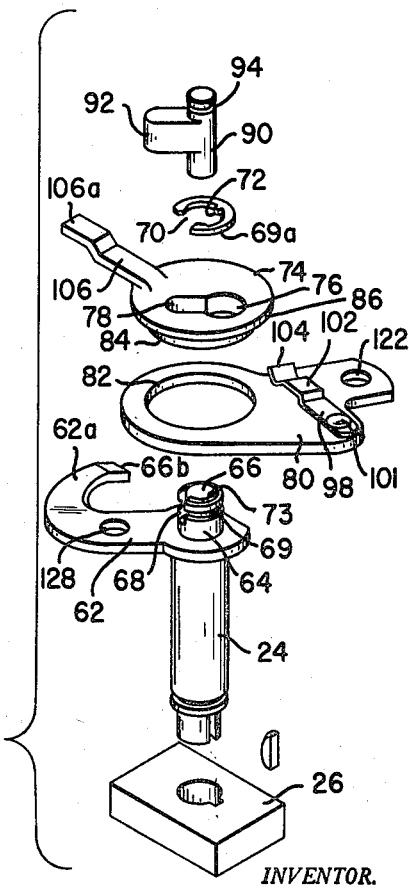
Fig. 6
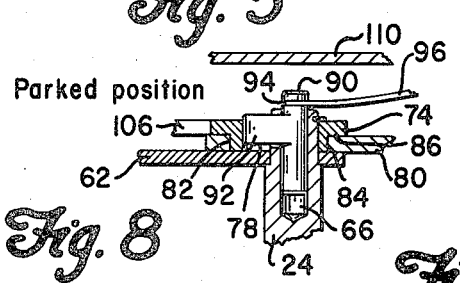
Fig. 8 — Parked position
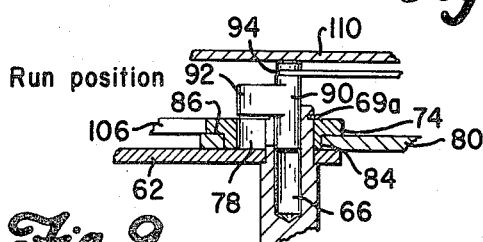
Fig. 9 — Run position
INVENTOR.
DONALD S. PERRY
BY
*Falvey, Souther & Stoltenberg*
ATTORNEYS

United States Patent Office 2,934,965
Patented May 3, 1960

2,934,965

PARKING WINDSHIELD WIPER

Donald S. Perry, Port Clinton, Ohio

Application March 25, 1957, Serial No. 648,404

17 Claims. (Cl. 74—70)

This invention relates to a device for converting rotary motion to an oscillatory motion, more particularly to an oscillatory windshield wiper for an automotive vehicle operated by a rotating device such as an electric motor, means also being provided in the device whereby the windshield wiper is parked in a position beyond its normal sweep of oscillation to place the wiper, during its inoperative periods, outside of the field of vision of an operator of the vehicle.

In the design of a modern automotive vehicle, space utilization under the hood and dashboard has become a serious problem, and every instrument or device mounted on the vehicle in this position must be condensed to occupy the smallest space possible commensurate with the cost of the device. It has been highly desirable to use the cheapest devices which occupy the smallest possible space without interference with other necessary devices and yet have the essential reliability and durability which the modern automotive vehicle possesses to a remarkable degree.

Inasmuch as the windshield wipers on an automotive vehicle are universally driven by an oscillatory motion through an arc across the windshield, if an electric motor is used as a source of power, a converting device must be provided to change the rotating motion of the electric motor to the oscillating motion of the windshield wiper. To accomplish this result in a compact device, where the oscillatory motion of the wiper approaches a simple harmonic motion with the rotative shaft of the driving device in close juxtaposition to the oscillating shaft is one of the principal objects of this invention.

Furthermore, a windshield wiper, to be commercially competitive, must have a so-called "off glass" parking device, wherein the wiper blade during inoperative periods is parked substantially parallel to the bottom edge of the windshield outside of the field of vision of the operator of the automotive vehicle. In the past, this has been accomplished, among other methods, by the use of a reversing electric motor in combination with a direction-sensitive device which changed the relation between the levers and links of the driving mechanism to park the windshield wiper in the "off-glass" position. The parking mechanism was immediately responsive to the change in position of the control switch by the operator, so that the wiper blade was reversed in its motion in almost any position on the windshield, which left a streak on the windshield at the point of reversal of the blade. This was highly undesirable for the operator as the streak often was in the locus of his driving vision. It is, therefore, a further object of this invention to provide an "off-glass" parking mechanism for a windshield wiper which changes the relation between the lever and links of the driving mechanism to attain parking without leaving a visible mark on the windshield glass.

Other objects and advantages of this invention relating to the arrangement, operation and function of the related elements of the structure, to various details of construction, to combinations of parts and to economies of manufacture, will be apparent to those skilled in the art upon consideration of the following description and appended claims, reference being had to the accompanying drawings forming a part of this specification wherein like reference characters designate corresponding parts in the several views.

Referring to the drawings:

Fig. 2 is a plan view of the driving mechanism with portions of the cover cut away;

Fig. 4 is an elevational view of a portion of the operating mechanism in normal operating position;

Fig. 5 is an elevation similar to Fig. 4 showing the mechanism in another position;

Fig. 6 is an exploded view of the mechanism shown in Figs. 4 and 5;

Fig. 7 is a sectional view taken along the line 7—7 of Fig. 4;

Fig. 8 is a sectional view taken along the line 8—8 of Fig. 5;

Fig. 9 is a view similar to Fig. 8 with the portions of the mechanism in a different operative position;

Fig. 10 is an elevational view taken along the line 10—10 of Fig. 2 with a portion of the casing cut away;

Fig. 11 is a sectional view taken along the line 11—11 of Fig. 10;

Figs. 12 and 13 are sectional views of the manual switch in different operative positions.

Figure 1:
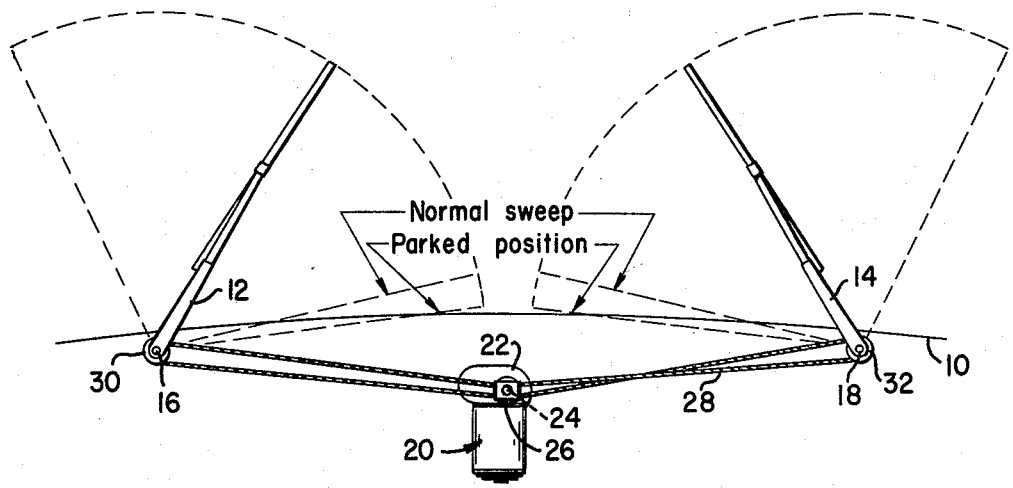
Fig. 1 is an elevation of the general organization of a windshield wiper on an automotive vehicle to which the invention has been applied.

Referring to the drawings, particularly to Fig. 1, the windshield 10 of an automotive vehicle is provided with a pair of oscillating wiper arms 12 and 14 including the usual wiper blades or squeegees which are normally oscillated through a predetermined angle of sweep about pivots 16 and 18 usually positioned in the lower member of the windshield. During the non-operative periods, the wiper arms and their blades are moved to a position beyond normal sweep of oscillation to be moved to an "off-glass" position which places the squeegee generally parallel to the bottom edge of the windshield outside of the normal field of vision of an operator who must view the road through the cleaned section of the windshield.

Figure 3:
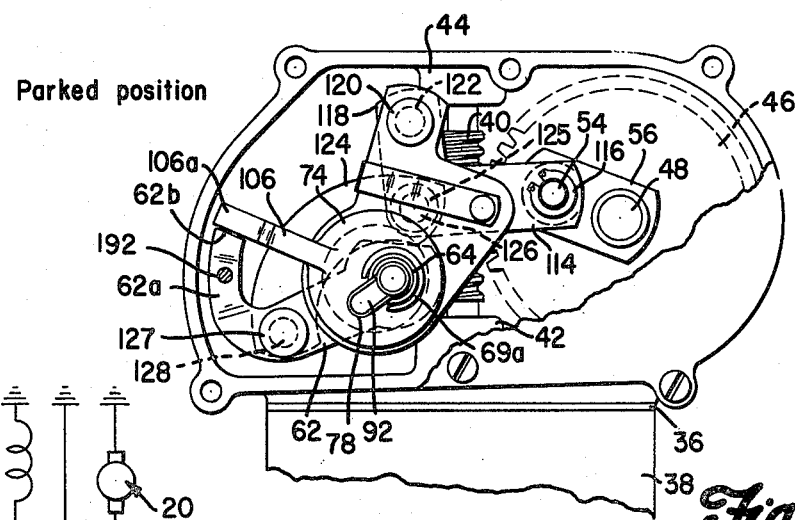
Fig. 3 is an elevation taken along the line 3—3 of Fig. 2.

To oscillate the wiper arms 12 and 14 about the pivots 16 and 18, an electric motor 20 is provided with a converting mechanism to be described hereinafter mounted in casing 22 from which an oscillating shaft 24 protrudes to oscillate a driver plate 26, which, in turn, drives the pivots in any convenient manner as, for example, by a cable 28 which is fitted around driving drums 30, 32, on the pivot shafts driving the arms 12 and 14. The electric motor 20 is conventional in design and may vary widely in its details of construction. The drive mechanism between the driver plate 26 and the arms 12 and 14 is also conventional in design and may vary widely to suit special situations. No further description of these portions of the mechanism is deemed necessary for a complete understanding of the invention. The casing 22 is supported on the framework of the automobile by suitable brackets (not shown) cooperating with bosses 33 and 34 integrally cast into the casing by any suitable fastening means. The casing is also provided with an integral end plate 36 which cooperates with the tubular casing 38 of the motor 20 as is best seen in Figs. 2 and 3. The plate 36 and the casing 38 are tightly fitted together to form a weather seal for the motor which is held in position on the casing 22 by suitable through-bolts (not shown) threaded into the plate 36. During assembly of the motor 20 to the casing 22, the upper end of the armature shaft, which is provided with a worm 40, is thrust through a journal bearing formed in an internal boss 42 of the casing 22 and then into a second journal formed in a depending internal boss 44, so that the shaft with its integral worm is supported at spaced points in the casing 22. If desired, a thrust bearing may be provided in the upper boss 44 to carry the end thrust of the worm while the worm 40 drives a worm gear 46, suitably mounted on a stub shaft 48 journalled in a bearing mounted in a boss 50 in the side 52 of the casing 22.

The worm gear 46, which is conveniently molded from nylon or other suitable plastic material or metal, is provided with an eccentric pin 54, which may be mounted on a crank arm 56 affixed to the end of the stub shaft 48 for greater strength if desired. The pin 54 may also extend into a suitable aperture in the gear 46 to form a permanent driving relation between the gear and its eccentric pin, which is driven in a circular orbit by the motor and the mechanism just described.

In converting the rotary motion of the eccentric pin 54 into an acceptable oscillatory motion suitable for driving a windshield wiper arm over a windshield, a converting mechanism must be evolved which moves the oscillatory member in a motion which at least approximates a simple harmonic motion. The simple harmonic motion has been generally considered acceptable as giving a smooth pleasing action to a windshield wiper without a loud slapping noise at the ends of the oscillatory stroke. The problem of obtaining such a motion becomes aggravated when the angle of motion of the oscillatory member becomes greater than ninety degrees and also when the shaft moving in a rotary motion is positioned in close juxtaposition with the shaft to be driven with an oscillatory motion. The close juxtaposition of these shafts is of considerable importance because a mechanism of this kind, to be accepted commercially, must be condensed to as great a degree as possible to make the mechanism small, so that the cost may be reduced and, at the same time, the space occupied by the mechanism shall be reduced to a minimum.

To carry this desideratum into practice, a novel mechanism for converting rotary motion into oscillatory motion has been provided, which gives a motion substantially approximating a simple harmonic motion, and, at the same time, condenses the size of the mechanism to make it feasible for commercial production.

The shaft 24, already mentioned, which is to be driven with an oscillatory motion, is mounted in the casing 22 closely juxtaposed to the worm 40 as is best seen in Fig. 2. The shaft 24 is journaled in bearings mounted in a boss 60 in the side 52 of the casing, so that it is substantially normal to the worm 40, and projects to the outside of the casing where the driven plate 26 is affixed to it to cooperate with the driving cable 28, as already described. The inner end of the shaft 24 is provided with a shoulder, against which is seated an arm 62 (Fig. 6) which is affixed to the shaft in any convenient manner. The shaft also extends beyond the arm 62 in a stub 64 of reduced diameter to provide the shoulder, already described, which is counterbored to provide a recess 66, the wall of which is slotted to form a keyway 68. Adjacent the terminus of the stub 64, an annular exterior slot 69 is provided to seat an open locking ring 69a, whose opening 70 is held in registery with the keyway 68, by an internal lug 72 seated in a transverse hole 73, bored in the wall of the stub 64 diametrically opposed to the keyway 68 at the level of the annular slot 69. The open locking ring 69a holds a cam plate member 74 in position on the stub 64 which is journalled thereon by aperture 76 which has a lateral extension 78 adapted to align at selected positions with keyway 68 as will be described further hereinafter. An idler arm 80 has an opening 82 which is journalled on the cam portion 84 of the cam plate member immediately above the arm 62, being held in this position by an overriding integral collar 86 on the cam plate member.

A control pintle 90 is provided to be rotatably positioned in the counterbore 66 of the stub 64, the pintle adjacent to upper end being provided with a laterally-extending key portion 92 which is adapted to fit into keyway 68 and the lateral extension 78 of the aperture 76 of the cam plate 74, so that when the keyway 68 is aligned with the extension 78 of the aperture and fitted within it, the cam member is locked to the shaft 24 to rotate therewith (Fig. 8). The upper terminus of the pintle 90 is provided with an annular groove 94, into which is fitted the slotted end of a control spring 96 (Figs. 8 and 9) which is normally biased to pull the pintle 90 to its disengaged position, generally shown in Fig. 9, but which is capable of being biased by a suitable manual means as will appear hereinafter to urge the pintle to engaged position as already described and which is generally shown in Fig. 8, which locks the cam member to rotate with the shaft 24 to change the operative relation between the cam 84 and and the idler arm 80 to provide an adjustable pivot point as will all be further described hereinafter.

The idler arm 80 is provided with a lock spring 98 on its outer face 100, to which the lock spring is attached by any suitable means for example by rivet 101. The spring 98 is provided with a locking bight 102 and a cam end portion 104, which cooperate with a central portion of an integral lever 106 on the cam member 74, whereby the lever 106 during normal operation fits into the locking bight 102 of the spring 98, as shown in Figs. 7 and 4, to lock together the idler arm 80 and the cam member 74, so that they rotate on a common center about the stub 64 of the shaft 24. When the key portion 92 of the pintle 90 drops into engaged position with the slot 68 and the lateral extension 78, as shown in Fig. 8, the lever 106 is pulled from its position in the spring bight 102 to rotate with the shaft 24 to an extreme position shown in Fig. 3 which establishes the "parked position," as will also be described hereinafter.

To bring the lever 106 back to its normal operating position when it is locked in the spring bight 102, the oscillating arm or member 62 is provided with a lateral extension 62a, which is raised upwardly to the plane of the terminus 106a of the lever 106, so that a flat terminating face 62b contacts the side of the lever portion 106a to rotate the members back to the position shown in Figs. 5 and 4, which is its normal operating position, whereby the oscillating shaft 24 is actuated through its normal sweep, which is reflected in the normal sweep of the wiper arms as shown in Fig. 1. Before the lever 106 can be locked in its normal operating position, as shown in Fig. 4, from its extreme or parked position, as shown in Fig. 3, the key 92 of the pintle 90 must be retracted upwardly from its locked position to release the locked relation of the cam member with the oscillating shaft 24, which has already been described. The pintle 90 is withdrawn by the resilient action of the spring 96 until it contacts the iner face of a cover 110, which closes the casing 22, being attached thereto by screws 112 as is best seen in Figs. 3 and 2. The cover forms a stop for the pintle 90, which limits the retraction of the pintle to a position where the key portion 92 is freed from the lateral extension 78 of the aperture 76 in the cam member 74, but is still in engaged relation with the slot 68 in the stub 64 of the shaft 24, as is best seen in Fig. 9, which shows the parts of the mechanism in the position described.

The longitudinal inward movement of the pintle 90 to parking relation may only occur through the action of the resilient spring 96 at the extreme right end of the stroke (Fig. 5) of the oscillating shaft 24. The pintle 90 can move into engaged position shown in Fig. 8 only when the parts of the mechanism are in the position shown in Fig. 5, at which time the key portion 92, which is always engaged with the slot 68 of the shaft 24, becomes aligned with the lateral extension or keyhole 78 of the aperture 76 in the cam member 74, and, therefore, may drop therein by the resilient urging of the spring 96, which is capable of being manually controlled as will appear hereinafter.

The longitudinal outward movement of the pintle 90, to change the relations of the mechanism from parking relation (Figs. 3 and 8) to normal relation for operation (Figs. 4, 5, and 9) may take place at any position of the stroke depending on the load conditions. When the spring 96 is released from its depressed position (Fig. 8) by a manual operation, a spring bias acting upwardly is applied to the pintle 90 with the mechanism in the parked position, shown in Fig. 3 which may immediately disengage the pintle, or the disengagement may occur at any point in the clockwise stroke (Fig. 3) of the shaft 24, but will certainly occur when the stroke is finished and reversal of the shaft occurs, at which point the load is zero. The interaction of the parts will be further described hereinafter in connection with the operation of the device.

The linkage arrangements by which the rotating eccentric pin 54 on the driver gear 46 oscillates the driven crank arm 62 affixed to the oscillating shaft 24, consists of two interconnected links, the first link 114 journalled to the eccentric pin 54 and held thereon by lock spring 116 is in the form of a bell crank, having a short, substantially normal arm portion 118 provided with an aperture which is journalled on rivet 120 fixed in an aperture 122 in the end of the idler arm 80, while the second link 124 is provided with an aperture which is journalled on a rivet 125 fixed in an aperture 126 at the end of the link 114 at the base of the short arm portion 118. For clearance, the second link 124 is given an arcuate shape, with its distal end provided with an aperture which is journalled on a rivet 127 affixed in aperture 128 adjacent the central portion of the driver arm 62 affixed to the shaft 24.

The spatial relation of the links 114 and 124, the eccentricity of driver pin 54, and arm 62, and the idler arm 118 is such that the shaft 24 is oscillated through a maximum angle of about 120° with substantially a simple harmonic motion, which is very desirable in the operation of a windshield wiper mechanism as avoiding abnormal accelerations at any point in the sweep of the windshield wiper arms. It may be pointed out that the 120° angle of oscillation is the maximum for the shaft 24, while it is obvious that the angle of sweep of the wiper arms 12 and 14 can be controlled readily by changing the ratios of the drums 16 and 18 with reference to the driver drum 24. The above mentioned spatial relation may be changed considerably to obtain various combinations to a maximum angle of oscillation of the shaft 24 being limited to about 120°.

The off-glass parking of the blades on the arms 12 and 14 on the windshield 10, is obtained by moving the arms through an additional angle, while the arms are adjacent to the innermost portion of their sweep. This angle is preferably about 14° which places the blades on the arms against the lower edge 10 of the windshield as indicated in Fig. 1. This additional angle of sweep for parking is obtained in the mechanism by changing the length of the idler arm 80 by the revolving of the cam 84 on which the idler arm 80 is journalled about the axis of the oscillating shaft 24 on which the cam is journalled by the mechanism already described hereinbefore. The pintle 90 controls the interlocking relation between the cam 84 and the shaft 24 which drives the cam through the agency of the key 92, cooperating with the slot 68 in shaft 24 and the keyhole 78 in the cam 84. The movement of the pintle 90 in locking and unlocking relation is under control of a manually actuatable mechanism shown best in Fig. 2.

The manual control mechanism consists of a Bowden wire 140, provided with a manual knob 142 for convenient reciprocation mounted on a dash 144. The lower end of the Bowden wire is affixed on a sliding insulating block 146 mounted on the outside of closure plate 110 and enclosed in a suitable housing 148 affixed in any convenient manner to the plate 110 as by the same screws 112 used to attach the plate 110 to the case 22. The block 146 slides in a bracket 149 positioned in an opening 150 in the housing 148 as shown. The block is provided with a spring detent 152 which cooperates with indentations 154 in the plate 110 to control the position of the block 146 in various locations as determined by the operator. Adjacent a central location, the block 146 is provided with an indentation 156 to cooperate with a sliding pin 158 mounted transversely in plate 110 in aperture 160, the inner end of the pin 158 being adapted to contact spring 96, which is anchored as by rivets to the inner side of the plate 110, being normally biased downwardly (Fig. 2) to pull the pintle 90 against the plate 110. The position of the pin 158 is capable of manual control by having the floor 162 of the indentation contoured to provide a camming surface which urges the pin 158 inwardly against the bias of the spring 96 depending upon the longitudinal position of the block 146. The position of the pin 158 controls, in turn, the bias of the inner end of the spring 96 which is active against the resistance of the pintle 90, to either urge the pintle downwardly and outwardly, or to resiliently urge the pintle upwardly and inwardly when the pin is positioned in its most inward position substantially as shown in Fig. 2.

The forward end (left end Fig. 2) of the insulating block 146 is provided with an integral extension 146a, on which are suitably mounted, as by rivets, electrical switch elements 170 and 172 in the form of transverse resilient strips of conducting material which are in sliding contact with fixed contact elements 174, 176, and 178 affixed to insulating plate 179 attached to the outside of plate 110 by rivets or the like. Through manual manipulation of the knob 142, the Bowden wire 140 transmits linear motion to integral extension 146A of block 146 to which are affixed electrical switch elements 170 and 172. The switch elements 170 and 172 slide across the fixed contact elements 174, 176, and 178 to control the circuits controlling the motor as will be seen by referring to Fig. 14. These controls and the motor circuits for the motor are conventional, and will not be described in further detail.

Figure 14:
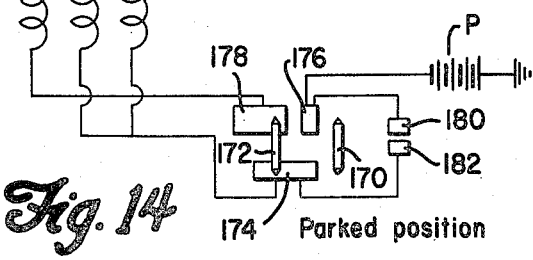
Fig. 14 is a schematic diagram of connections of the electric motor.

In parked position the arm 62 affixed to the oscillating shaft 24 actuates a parking switch indicated by the contacts 180 and 182 in Fig. 14, which opens the motor circuit when actuated by a cam portion 62a of the arm 62, which has already been described as being raised up to provide a means for returning the arm 106 of the cam 74 back to locked position under the spring 98. This relation of the parts is best seen in plan view in Fig. 2. The contact points 180 and 182 are mounted on suitable leaf springs 184 and 186, the latter being substantially longer to extend over a head pin 188 mounted on a bushed aperture 190 in the front plate 110, so that its inner end 192 falls within the locus of the cam member 62a, already described, being biased inwardly by the resiliency of the leaf spring 186. Leaf springs 184 and 186 are mounted in insulated relation on a bracket 194 which is affixed to the outer face of the plate 110, as clearly shown in Fig. 11. The contact points 180 and 182 are actuated by the cam portion 62a only when the elements of the device are in parked position which is about 14° beyond the normal sweep or arc of oscillation of the shaft 24 and the arm 62. During normal oscillation of the shaft 24, the cam portion 62a does not contact the inner end of the pin 192 and does not, therefore, actuate or open the contact points 180 and 182.

The operating cycle of the device is as follows: With the parts of the mechanism in parked position, as shown in Figs. 1, 2, 3, 10, and 14, with the contact points 180 and 182 in open position, and with the arm 62 positioned approximately 14° beyond its normal sweep, having been urged to this position by the change of position of the cam 84, which thereby shortened the length of the idler arm 80, so that the cam surface 62a of the arm 62 has pushed the pin 188 outwardly to open the contact points 180 and 182; and with the block 146 in its rightmost position (Fig. 2) which puts the pin 158 on the highest point of the cam surface 162 to bias the leaf spring 96 inwardly which urges the pintle 90 inwardly to place the key portion 92 of the pintle 90 into the key slot 78 to lock the cam to the shaft 24 to rotate therewith to change the position of the cam 84, as pointed out hereinabove, and with the contact elements 170 and 172 in the position shown in Fig. 10 where the contact element 172 closes the circuit between fixed elements 174 and 176, a new cycle of operation may begin.

To initiate the new cycle of operation, the operator actuates the button 142 on the Bowden wire 140 to push the block 146 to the left (Fig. 2) against the resistance of the detent 152 cooperating with the notches 154 in the cover plate 110. The movement of the detent one notch to the left puts the switch elements 170 and 172 in the position illustrated in Fig. 12, which connects the motor 20 to the power source P (Fig. 14) to operate at slow speed, whereby contact element 174 is connected to both elements 176 and 178. This causes the motor to rotate the worm gear 46 in a clockwise direction as viewed in Figures 3, 4, and 5 by the thrust of the worm 40. The initial position of the key 92 is shown in Fig. 8 where it is positioned in the key slot 78, but with the change of position of the block 146, the pin 158 has been released from the high point of the cam surface 162, and may, therefore, be forced downwardly by the bias of the leaf spring 96 when the conditions are propitious which, at the same time, will move the pintle 90 downwardly (Fig. 2) and remove the key 92 from the key slot 78. This may occur at any time during the first sweep of the arm 62 to the right, as seen in Fig. 2, which also at the end of the sweep pushes the cam arm 106 to its locked position under spring 98, as seen in Figs. 7 and 5. When a reversal of direction of movement of the arm 62 occurs under the action of the worm wheel 46 and the connecting linkage, the load conditions are most favorable to allow the spring 96 to move the pintle 90 so as to disengage the key 92 from the key slot 78. This disengages the cam from the shaft 24, and places the parts of the mechanism in normal operating relation with the length of the idler arm 80 back to normal length having moved from its shortened length utilized in parked position by the rotation of the cam 84 by the arm 62 through the agency of the face 62b contacting the cam lever portion 106a. The parts of the mechanism are now returned to normal operating position for operation at slow speed.

If the operator desires a period of high speed operation, he pushes the button 142 still further inwardly to urge the block 146 again to the left (Fig. 2), so that the detent engages the leftmost notch, which only changes the position of the switch elements 170 and 172 but does not change the relations within the mechanism. The new position of the switch elements for high speed operation are shown in Fig. 13, where the contact 170 closes the circuit between fixed elements 174 and 176 while element 172 is inactive. This connects the motor 20 for high speed operation.

To stop the operation of the windshield wiper, the operator moves the button 142 outwardly to place the detent 152 in the rightmost notch (Fig. 2) and again moves the switch elements 170 and 172 to the position shown in Fig. 10, which initiates the parking and stopping portion of the cycle. The contacts 180 and 182 are closed at this time to keep the motor 20 operating, and are actuated at a later time by a change in position in parts of the mechanism, viz., arm 62 which finally opens the contacts to shut off the power to the motor. The portion of the cycle to attain this end will now be described.

The change in position of the block 146 by the operator, moves also the cam surface 162 to the right which urges the pin 158 upwardly (Fig. 2) against the bias of the leaf spring 96. The left end of the leaf spring which contacts the slot in the end of the pintle 90, is held in fixed relation due to the fact that the pintle 90 can only move upwardly and inwardly when the key 92 is in alignment with the keyslot 78, which may only occur with the elements of the device in the position shown in Fig. 5 at the left end of the stroke of the arm 62 and the shaft 24, so that a reverse bend is placed in the leaf spring to place a bias on the pintle 90 to resiliently urge the pintle 90 inwardly when the parts are in positions other than that shown in Fig. 5. The motor will continue to operate until the mechanism passes through the aforementioned position, at which time the key portion 92 drops into the key hole 78 and thereby establishes a driving relation between the shaft 24 and the cam member or eccentric 84, so that on the next leftward stroke (counterclockwise) from the position shown in Fig. 5, the cam or eccentric 84 will be rotated in the same direction to the final position shown in Fig. 3, which is the parked position. The rotation of the cam or eccentric 84 changes the center of rotation of the idler arm 80 and effects a shortening of its effective length, which, in the mechanism shown, moves the pivot rivet 120 closer to the shaft 24, having the ultimate effect of lengthening the sweep of the linkage to move the arm 62 and the shaft 24, 14° further in a counterclockwise direction to the final parked position shown in Fig. 3. This additional movement of 14° causes the wiper arms 12 and 14 to move to depressed or off-glass parked position along the bottom edge of the windshield.

The extra movement of the arm 62 moves the arm into the locus of the pin 188, so that the cam surface 62a on the arm 62 contacts the inner end 192 of the pin 188 to thrust it downwardly and outwardly to open contacts 180 and 182, which breaks the motor circuit to the power source and it coasts to a stop thereby causing the off-glass parking of the wiper arms. This closes the cycle of operation of the device.

It is to be understood that the above detailed description of the present invention is intended to disclose an embodiment thereof to those skilled in the art, but that the invention is not to be construed as limited in its application to the details of construction and arrangement of parts illustrated in the accompanying drawings, since the invention is capable of being practiced and carried out in various ways without departing from the spirit of the invention. The language used in the specification relating to the operation and function of the elements of the invention is employed for purposes of description and not of limitation, and it is not intended to limit the scope of the following claims beyond the requirements of the prior art.

What is claimed:

1. A device for converting rotary motion to an oscillatory motion comprising a series of interconnected links and levers, a control lever oscillating about a fixed point whose free end is provided with a controlling pivot point, a pair of links pivotally connected together at their inner ends while their outer ends are eccentrically connected to a rotating input member and an oscillating output member of the links to the controlling pivot point of the control lever whereby a fixed distance is maintained between them.

2. A device for converting rotary motion to an oscillatory motion comprising a series of interconnected links and levers, a control lever oscillating about a fixed point whose free end is provided with a controlling pivot point, a pair of links pivotally connected together at their inner ends while their outer ends are eccentrically connected to a rotating input member and an oscillating output member respectively, means connecting the pivotal point of the links to the controlling pivot point of the control lever whereby a fixed distance is maintained between them, and means to vary the length of the control lever.

3. A device for converting rotary motion to an oscillatory motion comprising a series of interconnected links and levers, a control lever oscillating about a fixed point, whose free end is provided with a controlling pivot point, a pair of links pivotally connected together at their inner ends while their outer ends are eccentrically connected to a rotating input member and an oscillating output member respectively, and means connecting the pivotal point of the links to the controlling pivot point of the control lever whereby a fixed distance is maintained between them, said centers of oscillation of the control lever and the output member being concentric.

4. A device for converting rotary motion to an oscillatory motion comprising a series of interconnected links and levers, a control lever oscillating about a fixed point, whose free end is provided with a controlling pivot point, a pair of links pivotally connected together at their inner ends while their outer ends are eccentrically connected to a rotating input member and an oscillating output member respectively, means connecting the pivotal point of the links to the controlling pivot point of the control lever whereby a fixed distance is maintained between them, said centers of oscillation of the control lever and the output member being concentric, and means to control the length of the control lever.

5. In a device for converting a rotary motion to an oscillatory motion and for parking a member to be oscillated beyond its normal path of oscillation comprising a series of interconnected links and lever members, means at selected times to change the relation of the interconnection of the link and lever members when the oscillating member is at one end of its oscillatory path whereby the oscillating member at the other end of its oscillatory path is moved beyond its normal path into a parked position, and means to return the relation of the interconnection of the link and lever members to normal when a new period of operation of the device commences from a parked position.

6. In a device for converting the rotary motion of an input member to an oscillatory motion of an output member and for parking the member to be oscillated beyond its normal path of oscillation comprising a series of interconnected links and lever members, means including a cam means cooperating with the oscillating output member to change the relation of the interconnection of the link and lever members when the oscillating output member is at one end of its oscillatory path whereby the oscillating output member at the other end of its oscillatory path is moved beyond its normal path into a parked position.

7. In a device for converting the rotary motion of an input member to an oscillatory motion of an output member and for parking the member to be oscillated beyond its normal path of oscillation comprising a series of interconnected links and lever members, means including a manually controlled spring-urged interlock cooperating with the output member to change the relation of the interconnection of the link and lever members when the oscillating output member is at one end of its oscillatory path whereby the oscillating output member at the other end of its oscillatory path is moved beyond its normal path into a parked position.

8. In a device for converting the rotary motion of an input member to an oscillatory motion of an output member and for parking the member to be oscillated beyond its normal path of oscillation comprising a series of interconnected links and lever members, an input link eccentrically connected to the rotating input member, an output link eccentrically connected to the oscillating output member, said input and output links being pivotally connected at their free ends, a control lever oscillating about an adjustable pivot point having its free end adapted to control the arc of sweep of the pivotal connection between the input and output links, and means to adjust the length of the control lever positioned at the pivot point of the control lever to vary said arc of sweep to thereby park the oscillating member beyond its normal path of oscillation.

9. In a device for converting the rotary motion of an input member to an oscillatory motion of an output member and for parking the member to be oscillated beyond its normal path of oscillation comprising a series of interconnected links and lever members, an input link eccentrically connected to the rotating input member, an output link eccentrically connected to the oscillating output member, said input and output links being pivotally connected at their free ends, a control lever oscillating about an adjustable pivot point having its free end adapted to control the arc of sweep of the pivotal connection between the input and output links, and means to adjust the pivot point of the control lever to vary said arc of sweep to thereby park the oscillating member beyond its normal path of oscillation.

10. In a device for converting the rotary motion of an input member to an oscillatory motion of an output member and for parking the member to be oscillated beyond its normal path of oscillation comprising a series of interconnected links and lever members, an input link eccentrically connected to the rotating input member, an output link eccentrically connected to the oscillating output member, said input and output links being pivotally connected at their free ends, a control lever oscillating about an adjustable pivot point having its free end pivotally connected to a lateral projection of one of the links to control the arc of sweep of the pivotal connection between the input and output links, and means to control the adjustable pivot point to vary the length of the control lever to vary said arc of sweep to thereby park the oscillating member beyond its normal path of oscillation.

11. In a device for converting the rotary motion of an input member to an oscillatory motion of an output member and for parking the member to be oscillated beyond its normal path of oscillation comprising a series of interconnected links and lever members, an input link eccentrically connected to the rotating input member, an output link eccentrically connected to the oscillating output member, said input and output links being pivotally connected at their free end, a control level oscillating about an adjustable pivot point having its free end pivotally connected to a lateral projection of one of the links to control the arc of sweep of the pivotal connection between the input and output links, and means to control the adjustable pivot point to vary the length of the control lever capable of being actuated only at one end of the oscillatory path of the oscillatory output member to vary said arc of sweep to thereby park the oscillating member beyond its normal path of oscillation at the other end of its oscillatory path.

12. In a device for converting a rotary motion to an oscillatory motion and for parking a member to be oscillated beyond its normal path of oscillation comprising a series of interconnected link and lever members, the input member of which is rotated and the output member is oscillated, an input link eccentrically connected to the rotating input member, an output link eccentrically connected to the oscillating output member, said input and output links being pivotally connected at their free ends, a lateral extension on the input link adjacent the pivot point of the input and output links, an oscillating lever oscillating about a fixed point and pivotally connected to the end of the lateral extension of the input link, and means to control the length of the oscillating lever to control the path of oscillation of the oscillating output member.

13. In a device for converting a rotary motion to an oscillatory motion and for parking a member to be oscillated beyond its normal path of oscillation comprising a series of interconnected link and lever members, the input member of which is rotated and the output member is oscillated, an input link eccentrically connected to the rotating input member, an output link eccentrically connected to the oscillating output member, said input and output links being pivotally connected at their free ends, a lateral extension on the input link adjacent the pivot point of the input and output links, an oscillaing lever oscillating about a fixed point and pivotally connected to the end of the lateral extension of the input link, and means capable of being actuated at only one end of the oscillation of the output member to control the length of the oscillating lever to park the oscillating output member beyond its normal sweep at the other end of its oscillation.

14. In a device for converting a rotary motion to an oscillatory motion and for parking a member to be oscillated beyond its normal path of oscillation comprising a series of interconnected link and lever members, the input member of which is rotated and the output member is oscillated about a pivot, an input link eccentrically connected to the rotating input member, an output link eccentrically connected to the oscillating output member, said input and output links being pivotally connected at their free ends, a lateral extension on the input link adjacent the pivot point of the input and output links, an oscillating lever oscillating about a fixed point concentric with the oscillation pivot of the output member and pivotally connected to the end of the lateral extension of the input link, and means including a cam and a spring loaded actuating mechanism to control the length of the oscillating lever to park the oscillating output member beyond its normal sweep.

15. In a device for converting a rotary motion to an oscillatory motion and for parking a member to be oscillated beyond its normal path of oscillation comprising a series of interconnected links and lever members, a control lever adapted for oscillation about an adjustable pivot point, the free end of the control lever being provided with a pivot, a pair of links pivotally connected together at their inner ends adjacent the control lever while their outer ends are eccentrically connected to a rotating input member and an oscillating output member respectively, means adapted to connect the pivotal point for the links and the pivot on the control lever to maintain a predetermined distance between them, and means adjacent the pivot point for the control lever to change the length of the control lever when the oscillaitng member is in a predetermined position at one end of its stroke, whereby the oscillating member at the other end of its stroke is moved beyond its normal path of oscillation into a parked position.

16. In a device for converting a rotary motion to an oscillatory motion and for parking a member to be oscillated beyond its normal path of oscillation comprising a series of interconnected links and lever members, a control lever adapted for oscillation about an adjustable pivot point, the free end of the control lever being provided with a pivot, a pair of links pivotally connected together at their inner ends adjacent the control lever while their outer ends are eccentrically connected to a rotating input member and an oscillating output member respectively, the center of oscillation of the output member being concentric with the adjustable pivot, means adapted to connect the pivotal point for the links and the pivot on the control lever to maintain a predetermined distance between them, and control means at the adjustable pivot point to change the length of the control lever including a cam and a spring-actuated preset member actuatable when the oscillating member is in a predetermined position at one end of its stroke, whereby the oscillating member at the other end of its stroke is moved beyond its normal path of oscillation into a parked position.

17. In a device for converting a rotary motion to an oscillatory motion and for parking a member to be oscillated beyond its normal path of oscillation comprising a series of interconnected links and lever members, a control lever adapted for oscillation about an adjustable pivot, the free end of the control lever being provided with a pivot, a pair of links pivotally connected together at their inner ends adjacent the control lever while their outer ends are eccentrically connected to a rotating input member and an oscillating output member respectively, means adapted to connect the pivotal point for the links and the pivot on the control lever to maintain a predetermined distance between them, and means at the adjustable pivot to change the length of the control lever when the oscillating member is in a predetermined position at one end of its stroke, whereby the oscillating member at the other end of its stroke is moved beyond its normal path of oscillation into a parked position, said means including mechanism to return the parts including the control lever to normal operating relation when the input member is again actuated for operation after parking.

References Cited in the file of this patent
UNITED STATES PATENTS

| | | |
|---|---|---|
| 2,721,046 | Leitch | Oct. 18, 1955 |
| 2,765,064 | Dyer | Oct. 2, 1956 |
| 2,775,900 | Vischulis | Jan. 1, 1957 |
| 2,856,783 | Reese | Oct. 21, 1958 |